US008918523B2

(12) United States Patent
Nag et al.

(10) Patent No.: US 8,918,523 B2
(45) Date of Patent: *Dec. 23, 2014

(54) GRAPHICAL USER INTERFACE (GUI) FOR ADMINISTERING A NETWORK IMPLEMENTING MEDIA AGGREGATION

(75) Inventors: Siddhartha Nag, Holmdel, NJ (US); Alfred D'Souza, Lincroft, NJ (US); Naveed Alam, Freehold, NJ (US); Rakesh Patel, Fairview, NJ (US)

(73) Assignee: Prom KS Mgmt Limited Liability Company, Wilmington, DE (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/469,610

(22) Filed: May 11, 2012

(65) Prior Publication Data
US 2012/0224586 A1   Sep. 6, 2012

Related U.S. Application Data

(60) Continuation of application No. 12/873,075, filed on Aug. 31, 2010, now Pat. No. 8,185,640, which is a division of application No. 09/689,222, filed on Oct. 11, 2000, now Pat. No. 7,886,054.

(51) Int. Cl.
G06F 15/16 (2006.01)
H04L 12/24 (2006.01)
H04L 29/06 (2006.01)
H04M 7/00 (2006.01)

(52) U.S. Cl.
CPC .......... *H04L 41/147* (2013.01); *H04L 41/20* (2013.01); *H04L 41/145* (2013.01); *H04L 41/0896* (2013.01); *H04L 41/0213* (2013.01); *H04L 41/22* (2013.01); *H04L 65/1009* (2013.01); *H04L 65/80* (2013.01); *H04L 41/12* (2013.01); *H04M 7/0081* (2013.01); *H04L 29/06027* (2013.01); *H04L 65/1069* (2013.01); *H04L 41/0806* (2013.01)

USPC .......................... 709/228; 709/223; 709/227

(58) Field of Classification Search
None
See application file for complete search history.

(56) References Cited

U.S. PATENT DOCUMENTS 5,394,522 A   2/1995   Sanchez-Frank et al.
(Continued)

FOREIGN PATENT DOCUMENTS

EP    632673    1/1995
(Continued)

OTHER PUBLICATIONS

Aggarwal, Alok et al., "Efficient Routing in Optical Networks", Journal of the ACM. vol. 43 Issue 6. ACM Press. Nov. 1996.,• • 973-1001.
(Continued)

*Primary Examiner* — Jeffrey R Swearingen
(74) *Attorney, Agent, or Firm* — Brundidge & Stanger, P.C.

(57) ABSTRACT

A graphical user interface (GUI) is disclosed that allows a user to identify routers, communities, residents and media aggregation managers existing on a network. The user may interactively select a path that includes two media aggregation managers and at least one router. The GUI predicts scheduled bandwidth utilization along the selected path for a variety of residents wishing to communicate across the path. The GUI may be utilized for initializing all media aggregation managers on the network along with provisioning each of the routers on the selected path. The GUI provisions all of the routers and initializes all of the media aggregation managers on the selected path simultaneously in order to accomplish the predicted schedule of usage provided by the GUI to the user and force all communication packets communicated between the residents to travel along the selected path.

16 Claims, 10 Drawing Sheets

(56) References Cited

U.S. PATENT DOCUMENTS

| | | | |
|---|---|---|---|
| 5,640,595 A | 6/1997 | Baugher et al. |
| 5,809,282 A | 9/1998 | Cooper et al. |
| 5,826,242 A | 10/1998 | Montulli |
| 5,831,975 A | 11/1998 | Chen et al. |
| 5,884,037 A | 3/1999 | Aras et al. |
| 5,903,735 A | 5/1999 | Kidder et al. |
| 5,958,009 A | 9/1999 | Friedrich et al. |
| 5,996,013 A | 11/1999 | Delp et al. |
| 6,009,469 A | 12/1999 | Mattaway et al. |
| 6,026,443 A | 2/2000 | Oskouy et al. |
| 6,041,353 A | 3/2000 | Hirata et al. |
| 6,046,981 A | 4/2000 | Ramamurthy et al. |
| 6,054,987 A | 4/2000 | Richardson |
| 6,061,723 A | 5/2000 | Walker et al. |
| 6,092,113 A | 7/2000 | Maeshima et al. |
| 6,104,721 A | 8/2000 | Hsu |
| 6,108,310 A | 8/2000 | Wilkinson et al. |
| 6,115,372 A | 9/2000 | Dinha |
| 6,125,397 A | 9/2000 | Yoshimura et al. |
| 6,154,465 A | 11/2000 | Pickett |
| 6,208,638 B1 | 3/2001 | Rieley et al. |
| 6,209,033 B1 * | 3/2001 | Datta et al. ............... 709/224 |
| 6,212,562 B1 | 4/2001 | Huang |
| 6,226,678 B1 | 5/2001 | Mattaway et al. |
| 6,243,376 B1 | 6/2001 | Ng et al. |
| 6,243,759 B1 | 6/2001 | Boden et al. |
| 6,259,771 B1 | 7/2001 | Kredo et al. |
| 6,298,120 B1 | 10/2001 | Civanlar et al. |
| 6,301,229 B1 | 10/2001 | Araujo et al. |
| 6,308,798 B1 | 10/2001 | Rashman et al. |
| 6,366,577 B1 | 4/2002 | Donovan |
| 6,370,154 B1 | 4/2002 | Wickham |
| 6,377,546 B1 | 4/2002 | Guerin et al. |
| 6,381,635 B1 | 4/2002 | Hoyer et al. |
| 6,412,000 B1 | 6/2002 | Riddle et al. |
| 6,418,139 B1 | 7/2002 | Akhtar |
| 6,442,268 B1 | 8/2002 | Klaghofer et al. |
| 6,442,615 B1 | 8/2002 | Nordenstam et al. |
| 6,463,089 B1 | 10/2002 | Chauncey et al. |
| 6,477,572 B1 | 11/2002 | Elderton et al. |
| 6,490,249 B1 | 12/2002 | Aboul-Magd et al. |
| 6,493,348 B1 | 12/2002 | Gelman et al. |
| 6,499,027 B1 | 12/2002 | Weinberger |
| 6,515,966 B1 | 2/2003 | Bardalai et al. |
| 6,519,254 B1 | 2/2003 | Chuah et al. |
| 6,549,940 B1 | 4/2003 | Allen et al. |
| 6,570,867 B1 | 5/2003 | Robinson et al. |
| 6,594,265 B1 | 7/2003 | Fichou et al. |
| 6,594,268 B1 | 7/2003 | Aukia et al. |
| 6,594,279 B1 | 7/2003 | Nguyen et al. |
| 6,606,668 B1 | 8/2003 | MeLampy et al. |
| 6,611,516 B1 | 8/2003 | Pirkola et al. |
| 6,639,981 B1 | 10/2003 | Dunn, Jr. et al. |
| 6,640,248 B1 | 10/2003 | Jorgensen |
| 6,643,258 B1 | 11/2003 | Ise et al. |
| 6,647,208 B1 | 11/2003 | Kirby |
| 6,654,803 B1 | 11/2003 | Rochford et al. |
| 6,658,457 B2 * | 12/2003 | Nishikawa et al. ............ 709/206 |
| 6,667,968 B1 | 12/2003 | Tran |
| 6,675,387 B1 | 1/2004 | Boucher et al. |
| 6,678,729 B1 | 1/2004 | Ahoor et al. |
| 6,680,943 B1 | 1/2004 | Gibson et al. |
| 6,690,678 B1 | 2/2004 | Basso et al. |
| 6,714,987 B1 | 3/2004 | Amin et al. |
| 6,728,365 B1 | 4/2004 | Li et al. |
| 6,738,383 B1 | 5/2004 | Kliland et al. |
| 6,744,767 B1 * | 6/2004 | Chiu et al. ............ 370/395.21 |
| 6,751,677 B1 | 6/2004 | Ilnicki et al. |
| 6,771,661 B1 * | 8/2004 | Chawla et al. ............ 709/226 |
| 6,775,701 B1 | 8/2004 | Pan et al. |
| 6,798,786 B1 | 9/2004 | Lo et al. |
| 6,804,224 B1 | 10/2004 | Schuster et al. |
| 6,831,932 B1 | 12/2004 | Boyle et al. |
| 6,870,845 B1 | 3/2005 | Bellovin et al. |
| 6,904,110 B2 * | 6/2005 | Trans et al. ............... 375/350 |
| 6,909,708 B1 | 6/2005 | Krishnaswamy et al. |
| 6,910,074 B1 | 6/2005 | Amin et al. |
| 6,925,076 B1 | 8/2005 | Dalgic et al. |
| 6,937,566 B1 | 8/2005 | Forslow |
| 6,940,814 B1 | 9/2005 | Hoffman |
| 6,967,958 B2 | 11/2005 | Ono et al. |
| 6,973,027 B1 | 12/2005 | Shaffer et al. |
| 6,977,896 B1 | 12/2005 | Kobayashi |
| 6,985,957 B2 | 1/2006 | Fujita |
| 7,002,993 B1 | 2/2006 | Mohaban et al. |
| 7,013,338 B1 | 3/2006 | Nag et al. |
| 7,016,375 B1 | 3/2006 | Rosenberg et al. |
| 7,051,070 B2 | 5/2006 | Tuttle et al. |
| 7,072,295 B1 | 7/2006 | Benson et al. |
| 7,075,915 B1 | 7/2006 | Gustke |
| 7,124,187 B1 | 10/2006 | Kodialam et al. |
| 7,136,377 B1 | 11/2006 | Tweedly et al. |
| 7,143,152 B1 | 11/2006 | Elman et al. |
| 7,209,473 B1 | 4/2007 | Mohaban et al. |
| 7,221,384 B2 | 5/2007 | Mueller et al. |
| 7,221,662 B2 | 5/2007 | Koistinen |
| 7,266,683 B1 | 9/2007 | Nag |
| 7,266,832 B2 | 9/2007 | Miller |
| 7,269,657 B1 | 9/2007 | Alexander et al. |
| 7,274,662 B1 | 9/2007 | Kalmanek, Jr. et al. |
| 7,280,528 B1 | 10/2007 | Polit et al. |
| 7,305,000 B2 | 12/2007 | Horiba |
| 7,480,305 B1 | 1/2009 | Somasundaram |
| 7,606,146 B1 | 10/2009 | Pan et al. |
| 7,693,062 B2 | 4/2010 | Perkins et al. |
| 7,774,468 B1 | 8/2010 | Nag et al. |
| 7,924,849 B2 | 4/2011 | Gallant et al. |
| 2001/0024878 A1 | 9/2001 | Nakamura |
| 2002/0015387 A1 | 2/2002 | Houh |
| 2002/0030696 A1 | 3/2002 | Twinkwalder et al. |
| 2002/0049841 A1 | 4/2002 | Johnson et al. |
| 2002/0049860 A1 | 4/2002 | Koistinen |
| 2002/0120741 A1 | 8/2002 | Webb et al. |
| 2002/0152305 A1 | 10/2002 | Jackson et al. |
| 2002/0174227 A1 | 11/2002 | Hartsell et al. |
| 2002/0188720 A1 | 12/2002 | Terrell et al. |
| 2002/0199012 A1 | 12/2002 | Cable et al. |
| 2003/0026423 A1 | 2/2003 | Unger et al. |
| 2003/0028535 A1 | 2/2003 | Sheldon et al. |
| 2003/0035024 A1 | 2/2003 | Chen et al. |
| 2003/0046396 A1 | 3/2003 | Richter et al. |
| 2003/0053463 A1 | 3/2003 | Vikberg et al. |
| 2003/0091049 A1 | 5/2003 | Abe et al. |
| 2003/0126287 A1 | 7/2003 | Charny et al. |
| 2003/0219029 A1 | 11/2003 | Pickett |
| 2004/0039820 A1 | 2/2004 | Colby et al. |
| 2004/0057435 A1 | 3/2004 | Ruyle et al. |
| 2004/0073641 A1 | 4/2004 | Minhazuddin et al. |
| 2004/0172464 A1 | 9/2004 | Nag |
| 2004/0205239 A1 | 10/2004 | Doshi et al. |
| 2005/0018652 A1 | 1/2005 | Crouch et al. |
| 2005/0044161 A1 | 2/2005 | Fujita |
| 2005/0083842 A1 | 4/2005 | Yang et al. |
| 2005/0128951 A1 | 6/2005 | Chawla et al. |
| 2005/0138204 A1 | 6/2005 | Iyer et al. |
| 2005/0198261 A1 | 9/2005 | Durvasula et al. |
| 2005/0210292 A1 | 9/2005 | Adams et al. |
| 2006/0016094 A1 | 1/2006 | Covert |
| 2006/0020694 A1 | 1/2006 | Nag et al. |
| 2006/0056298 A1 | 3/2006 | Nag et al. |
| 2007/0168517 A1 | 7/2007 | Weller et al. |
| 2009/0296734 A1 | 12/2009 | Nag |

FOREIGN PATENT DOCUMENTS

| | | |
|---|---|---|
| EP | 1017200 | 7/2000 |
| JP | 07105103 | 4/1995 |
| WO | WO0077988 | 12/2000 |
| WO | WO0105115 | 1/2001 |
| WO | WO0131939 | 5/2001 |

(56) References Cited

FOREIGN PATENT DOCUMENTS

WO     WO0213023     2/2002
WO     WO0217036     2/2002

OTHER PUBLICATIONS

HPSR 2002 Technical Program; http;//www.ieice.org/hpsr2002/detail.html; 2003; pp. 1-8.
"Netcool Precison for IP Networks Discovery & Topology Based RCA", Micromuse, Inc., 2002, 2 Pages.
"Vivinet Assessor; NetIQ", retrieved from Internet at http:Ilnetiq.com/products/valdefaultasp?print=true;, 1993-2004 NetIQ Corporation, 1 Page.
HP Open View. Service Quality Manager 1.1 data sheet, 2003, Hewlett-Packard Development Company. L.P. (4 pages).
Braden, R. RFC 2205. Network Working Group, 1997. 105 Pages.
Maxemchuk, N. F., "Applying Packet Techniques to Cellular Radio", Wireless Networks, vol. 5, Issue 6, Kluwer Academic Publishers,(Dec. 1999), pp. 519-536.
Terzis, A. et al., "Reservations for aggregate traffic: experiences from an RSVPtunnels implementation", 1998 Sixth 6th International Workshop on Quality of Service (IWOoS), ISBN 0780344820,(1998), 3 pages.
Terzis, A. et al., "RSVP Operation Over IP Tunnels", Request for Comments (RFC) 2746 (Jan. 2000), 25 Pages.
Baker, F. et al., "Aggregation of RSVP for IPv4 and IPv6 Reservations", Retrieved from: <http://www.iettorq/rfc/rfc3175.txt?number=3175> on Nov. 10, 2003, (Sep. 2001), 34 pages.
Braden, R et al., "RFC2205 Resource ReSerVation Protocol (RSVP) Version 1 Functional Specification", Printed from Internet at: <113://www.faqs.orq/rfcs/rfc2205.html> on Sep. 1997, 79 pages.
Zhu, C et al., "RFC 2190 RTP Payload Format for H.263 Video Streams" Printed from Internet at htto://www.faqs.orq/rfcs/rfc2190.html on Sep. 1997, 10 pages.
Handley, M et al., "SIP: Session Initiation Protocol" Retrieved from: <ftp://ftp.isl.edu/in-notes/rfc2543.txt> on Aug. 26, 2004, (Mar. 1999), 143 pages.
"SIP Session Initiation Protocol", Printed from Internet at http://www.cs.columbia.edu/sip, Updated Aug. 2004, 1 page.
"SIP Session Initiation Protocol Implementations News", Printed from Internet at http://www.cs.columbia.edu/sip/news.html, Updated Aug. 2004, 4 pages.
"Measures network performance and predicts the impact of changes Chariot", 2004 NetIQ Corporation, 2 pages.
"NetIQ Chariot", Printed from Internet at http://www.netiq.com/products/chr/defaultasp?print=true, 1993-2004 NetIQ Corporation, 1 page.
"Delivers comprehensive service management for windows UNIX and Linux systems and applications", NetIQ AppManager Suite 2004 NetIQ Corporation, 4 pages.
"Delivers Enterprise VoIP QoS and Management", AppManaqer for VoIP 2004 NetIQ Corporation, 4 pages.
"NetIQ's VoIP Management Solution", 2004 NetIQ Corporation, 2 pages.
"NetIQ Appmanager for VoIP", 1993-2004 NetIQ Corporation, Printed from the Internet at htt- IN..neti..corn/-roductsiamtmodulestvoi- =true, 1 page.
Pearsall, Susan et al., "Doing a VoIP Assessment with Vivinet Assessor", NetIQ Work Smarter 2001-2002 NetIQ Corporation, (2001), pp. 1-19.
"Delivers the leading software solution for assessing a data network's readiness for VoIP", Vivinet Assessor 2004 NetIQ Corporation, 2 pages.
"NetIQ Vivinet Assessor", Printed from the Internet at http://www.netig.com/products/va/defaultasp?print=true, 1993-2004 NetIQ Corporation, 1 page.
"Pinpoints VoIP quality problems in minutes", Vivinet Diagnostics 2004 NetIQ Corporation, 2 pages.

"NetIQ Vivinet Diagnostics", Printed from the Internet at http://www.netig.com/products/vd/defaultasp?print=true, 1993-2004 NetIQ Corporation, 1 page.
"NetIQ VoIP Management Solution", Printed from the Internet at htto://www.netid.com/solutions/voio/default.aso?orint=true, 1993-2004 NetIQ Corporation, 1 page.
"Micromuse Products & Solutions Netcool Suite Overview" Printed from the Internet at http://www.micromuse.com/products sols/index.html, Micromuse Inc,(2004), 9 pages.
"Netcool Solutions for Voice Over IP", Realtime Service Quality Management for IP Telephony Services, Micromuse Inc, 4 pages.
"Netcool Solutions for Enterprise", End to End Business and Service Assurance, Micromuse Inc, 5 pages.
"Netcool System Service Monitors White Paper", Including Netcool Application Service Monitors, Micromuse Inc,(2003), 8 pages.
"Netcool Monitors Product Family Realtime and Trended Performance", Status and Service Monitoring., Micromuse Inc,(2004), 4 pages.
"Netcool Usage Service Monitors White Paper (Netcool/USMs)", 2003 Micromuse Inc, (2003), 11 pages.
"Netcool Precision for IP Networks Discovery & Topology Based RCA", Micromuse Inc. 2002 2 pages.
"Realtime Event Management for Business and Service Assurance", Micromuse Inc, 4 pages.
Farrell, Craig Grappling With Management of IP Telephony, www.itmaq.com, Technology Marketing Corporation,(May 2004), 2 pages.
"NetIQ VoIP Manager Connector for Netcool/OMNIbus", Micromuse Inc, 1 page.
Allen, Pete "Putting new service management tactics to work Service providers can make smarter use of service management technology", ServerWorld, vol. 16, No. 4 Apr. 2002, 3 pages.
"HP OpenView Network Services Management Business blueprint", 2004, Hewlett Packard Development Company LP, 6 pages.
"Management Software IP telephony management solutions overview & features", Printed from the Internet at http://www.openview.hp.comicgi-gin/pfnew.cgi?IN=hp//partnersinnm/prod nnm 0002.h . . . , Hewlett-Packard Development Company LP,(2004),1 page.
"Management Software Alliance with Cisco Systems Inc", Printed from the Internet at http://www.openview.hp.comicgi-bin/pfnew.cgi?IN=holloartnersialliance/ball 0001.html, Hewlett-Packard Development Company LP,(2004), 2 pages.
"Cisco HP Smart Way 2004 Solution Brief" 2004, Cisco Systems and Hewlett Packard 4 pages.
"HP Open View", Network Node Manager Smart Plug-in for Advanced routing 1.0 Data sheet, 2003-2004, Hewlett-Packard Development Company LP,4 pages.
"HP OpenView Performance Insight Report Pack for IP Telephony 1.2", 2004, Hewlett-Packard Development Company LP, (2004),8 pages.
"Hp OpenView", glanceplus and glanceplus pak product brief, Hewlett-Packard Company,(2003), 6 pages.
"HP OpenView Performance Manager", Performance Monitor and Performance Agent data sheet Hewlett-Packard Development Company LP,(2003), 4 pages.
"HP Open View", Service Quality Manager 1.1 data sheet, Hewlett-Packard Development Company LP,(2003), 4 pages.
"Hp OpenView", service information portal 3.1 product brief, Hewlett-Packard Company,(2003), 4 pages.
"Hp OpenView", problem diagnosis 1.1 product brief, Hewlett-Packard Company,(2002), 4 pages.
"HP OpenView Performance Insight Pack for Infrastructure Usage", 2004, Hewlett Packard Company LP, (2004), 6 pages.
"HP OpenView", Network Node Manager Smart Plug-in for Advance Routing 1.0 Data sheet, 2003-2004, Hewlett-Packard Development Company LP, 4 pages.
"HP OpenView" Customer Views 1.4 for Network Node Manager data sheet, Hewlett Packard Development Company LP,(2003), 4 pages.

(56) References Cited

OTHER PUBLICATIONS

"Hewlett-Packard OpenView about Hewlett-Packard OpenView", Printed from the Internet at http://www.manaqementsoftware.hp.com/cqi-bin/pfnew.cqi?IN=hpllabout/index.html, Hewlett-Packard Development Company LP,(2004), 2 pages.

"Hp OpenView", service quality manager product overview, Hewlett-Packard Company,(2003),16 pages.

"Intelligent Diagnostics for Networks Beyond root cause analysis", A white paper from HP preliminary, Hewlett-Packard Development Company LP,(2003),12 pages.

"HP OpenView Operations 7.x for Windows", Firewall Configuration white paper, Hewlett-Packard Company,(2002), 60 pages.

"Gain strategic advantage with HP IT Service Management", White paper, Hewlett Packard Development Company LP,(2003), 8 pages.

Harbaum, Till et al., "Layer 4+Switching with QOS Support for RTP and HTTP", Global Telecommunication Conference, GLOBECOM '99,(1999),pp. 1591-1596 "Final Office Action", U.S. Appl. No. 11/267,922, (May 14, 2009),14 pages.

Kankkunen, A. et al., "VoIP over MPLS Framework Internet Draft" Retrieved from: <http://tools.ietf.orq/html/draft-kankkunen-vompls-fw-01> on Oct. 17, 2007, Internet Engineering Task Force, (Jul. 2000),58 pages.

"HPSR 2002 Technical Program", Retrieved from http://www.ieice.orq/hpsr2002/detail.html, 2003,8 pages.

"MeraVoice over IP Solutions", Retrieved from http://www.meravoip.com/support/qlossary.php, VOIP Technology and Product: VoIP Glossary, 2003, 6 pages.

"Entities", Retrieved from <http://ai3.asti.dost.qov.ph/h.323/entities.htm> on Dec. 11, 2003, pp. 1-6.

"CISCO IOS Software Release 12.0 T", Retrieved from http://www.cisco.com/enUS/products/sw/iosswrel/ps1830/products>on Dec. 11, 2003, 12 pages.

"The Drivers for Voice Over IP", Retrieved from http://www.voipcalculator.com/drivers.html, 2003, 3 pages.

"Voice over IP Protocols for Voice Transmission", Retrieved from http://voipcalculator.com/protocols.html, 2003, 6 pages.

"H.323 Primer an Introduction to H.323", Retrieved from http://voipcalculator.com/h323primer.html, 2003, 5 pages.

"Administrivia Last Time Endpoint Admission Control Paper This Paper Explore Tradeoffs for This Type of Solution", Suny-Binghamton, Lecture #24, (2003), 8 pages.

"DiffServ the Scalable End-to-End QoS Model", Cisco Systems, 2001, 19 pages.

"Implementing DiffServ for End-to-End Quality of Service", Cisco IOS Release 12.1(5)T, 22 pages.

"Low Latency Queuing", Cisco IOS Release 12.0(26)S, 14 pages.

Blake, S et al., "An Architecture for Differentiated Services", Retrieved from: <http://www.iettorg/rfc/rfc2475.txt> on Dec. 4, 2003, The Internet Society, (Dec. 1998),34 pages.

Blefari-Melaiii, N. et al., "Charging IP Network Services in a DiffSery Environment", Proceedings of Advanced Internet Charging and QoS Technology 2001 fICQT'01) Workshoa, Vienna, Austria, Sep. 2001,(Aug. 2001), 11 pages.

Jamalipour, Abbas et al., "Next Generation Broadband Wireless Networks and Navigation Services", Retrieved from: <http://www.comsoc.org/livepubs/ci1/Public/2002/Feb/gstediamal.html> on Dec. 11, 2003, Guest Editorial, (Feb. 2002), 4 pages.

Roaten, Bob "IP Telephony and EIC a Technical Overview" Interactive Intelligence, (Jul. 22, 1998), pp. 1-8.

Tewari, et al., "A New Call Admission Control Scheme for Real Time Traffic in Wireless Networks", Conference on Convergent Technologies for Asia-Pacific Region, vol. 4, Issue Oct. 15-17, 2003, TENCON 2003, 5 pages.

Hwang, Junseok "A Market Based Model for the Bandwidth Management of Intserv-DiffSery QoS Interconnection: A Network Economic Approach", Dissertation, University of Pittsburgh School of Information Sciences, (2000), 204 pages.

Kim, Jin-Cheol et al., "A Dynamic Admission Control Scheme in a DiffSery Domain", Workshop on High Performance Switching and Routing., (2002), 5 pages.

Siler, et al., "Measurement Based Admission Control and Monitoring for Statistical Rate Latency Guarantees", Proceedings of the 38th Conference on Decision & control, Phoenix, AZ, Dec. 1999, 6 pages.

Almesberger, et al., Scalable Resource Reservation for the Interne, IEEE, '1997, pp. 18-27.

Nag, Siddhartha et al., "U.S. Patent Application entitled Differentiated Services (DiffServ) traffic admission control", U.S. Appl. No. 11/038,445, (Jan. 18, 2005), 34 pages.

"AdventNet Products", Retrieved from http://a1132.g.akamai.net/7/1132/1581/1382cd01af18b6/www.adventnet.com/products.html on Sep. 13, 2000, AdventNet, 2 pages.

"Network Node Manager", Retrieved from http://www.openview.hp.com/products/nnm on Sep. 13, 2000, HP OpenView, 2 pages.

"Network Node Manager Interactive Demos", Retrieved from http:://ovweb1.external.hp.com/nnminteract on Sep. 13, 2000, 2 pages.

"Cisco Network Management", Retrieved from http://ww.cisco.com/warp/public/44/iump/network management.shtml on Sep. 13, 2000 5 pages.

Greenstein, Larry "Transporting Voice Traffic Over Packet Networks", International Journal of Network Management, vol. 8, Issue 4, (Jul. 1998), pp. 227-234.

Muller, Nathan J., "Improving and Managing Multimedia Performance over TCP/IP Nets", International Journal of Network Management, vol. 8, (1998), pp. 356-367.

Eder, M et al., "Service Management Architectures Issues and Review" Retrieved from: <ftp://ftp.isi.edu/in-notes/rfc3052.txt> on Feb. 26, 2002, (Jan. 2001), 12 pages.

Eder, M et al., "IP Service Management in the QoS Network", Retrieved from: <http://search.iettorg/internet-drafts/draft-irtf-smrg-ipsmf-01.txt> on Feb. 26, 2002, (Nov. 2001), 15 pages.

Terzis AM "Adaptive Network Support for Mobile Multimedia", 1st Annual International Conference on Mobile Computing and Networking, ISBN 0897918142,(1995), pp. 62-74.

"International Search Report", International Application No. PCT/US2001/024878, (Dec. 19, 2001), 3 pages.

"International Search Report", International Application Serial No. PCT/US2003/035024, (May 28, 2004), 4 pages.

"European Search Report", Application No. EP03768594, (Mar. 24, 2006), 2 pages.

"International Search Report and Written Opinion", International Application No. PCT/US2006/016094, (Aug. 22, 2007), 8 pages.

"Vivinet Assessor; NetIQ", retrieved from internet at httb://netid.com/broducts/va/defaultasb?brint=true:, 1993-2004 NetIQ Corporation, 1 page.

"Management Software—Alliance with Cisco Systems, Inc." Printed from internet at httb://www.obenview.hb.com/cdi-bin/bfnew.cgi?IN=hp//products/nnm/prod nnm 0020.htms, Hewlett-Packard Development Company, L.P.,(2004), 2 pages.

"Smart Way 2004", Cisco Systems and Hewlett-Packard; 2004, 4 pages.

* cited by examiner

FIG. 8

GRAPHICAL USER INTERFACE (GUI) FOR ADMINISTERING A NETWORK IMPLEMENTING MEDIA AGGREGATION

CROSS REFERENCE TO RELATED APPLICATIONS

This application is a continuation of U.S. patent application Ser. No. 12/873,075, filed Aug. 31, 2010, now U.S. Pat. No. 8,185,640, issued May 22, 2012, which is a divisional of U.S. patent application Ser. No. 09/689,222, filed Oct. 11, 2000, now U.S. Pat. No. 7,886,054, issued Feb. 8, 2011, which is hereby incorporated by reference herein in its entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

Embodiments of the present invention are concerned with management of a Voice Over Internet Protocol (VoIP) network. More particularly, embodiments of the present invention are directed to a Graphical User Interface (GUI) that enables a system manager to initialize, based on predicted link utilization, a plurality of routers and media aggregation managers existing on a selected communication path. The initialization provides the media aggregation managers with reservation protocol session parameters and bandwidth allocation requirements for a predetermined schedule of usage over the VoIP network.

DESCRIPTION OF THE RELATED ART

Background of the Invention

Current network management tools such as Hewlett Packard's OPEN VIEW and ADVENTNET, have typically been used by System Administrators for detecting and analyzing faults that occur within a network. The programs generally discover a network and each node or router on the network submits to the administrator if and where faults exist in the network so that the System Administrator can address the problematic faults. The System administrator can select an individual router and provision the router through the OPEN VIEW and ADVENTNET GUI. When provisioning a router, the existing tools utilize a standard protocol such as Simple Network Management Protocol (SNMP) or command line interface. The standard protocol is typically communicated to the provisioning tool like OPEN VIEW or ADVENTNET by the router during the network discovery so that the protocol utilized for provisioning the router is hidden from the user. Provisioning a router includes router control parameters such as assigning an IP address to a router or assigning a bandwidth for a certain type of communication through the router.

One of the problems with the existing network management tools is that they do not provide for administration of VoIP networks. Another disadvantage of the current tools is that they do not allow a user to initialize multiple routers along a selected VoIP path.

SUMMARY

Methods and apparatus are described for administering a VoIP network that contains one or more media aggregation managers.

In one embodiment, a method of conveying information about a VoIP network to a user is disclosed. The method comprises: discovering a plurality of nodes on a VoIP network wherein the plurality of nodes includes a media aggregation manager that provides application/protocol specific multiplexing/demultiplexing of media traffic onto a pre-allocated reservation protocol session; and graphically depicting representations of the plurality of nodes and their interconnections on a network map, wherein the representations of the plurality of media aggregation managers are visually distinguishable from the remainder of the plurality of nodes.

In another embodiment, a method of allowing a user to interactively explore how changes in path selection between media aggregation managers affects projected link utilization in a network is disclosed. A graphical user interface displays graphical representations of a first media aggregation manager and second media aggregation manager. The first and second media aggregation managers serve as reservation session aggregation points between a first user community and a second user community and have a plurality of physical paths through which media packets may be exchanged by way of one or more packet forwarding devices. The GUI displays a first projected link utilization based upon an indication that a first path of the plurality of physical paths will be used to convey media packets between the first and second media aggregation managers. The GUI also displays a second projected link utilization based upon an indication that a second path of the plurality of physical paths will be used to convey media packets between the first and second media aggregation, managers.

In another embodiment, a method is disclosed wherein the method comprises: in response to a discovery request, discovering nodes on a network; identifying and graphically displaying the nodes and their interconnections on a map; receiving inputs including a first node, a second node and projected bandwidth traffic requirement between the first node and the second node; and displaying the projected bandwidth traffic requirement for the nodes.

In another embodiment, a graphical user interface is disclosed wherein the GUI comprises: a display portion that graphically depicts and identifies a plurality of nodes on a network, wherein the plurality of nodes includes a plurality of media aggregation managers that provide application/protocol specific multiplexing/demultiplexing of media traffic onto a pre-allocated reservation protocol session, and wherein the plurality of media aggregation managers are distinguishable from other nodes on the network.

In another embodiment, a method is disclosed wherein the method comprises: receiving a first input indicating a first media aggregation manager; receiving a second input indicating a second media aggregation manager; receiving a third input indicating a projected utilization between the first media aggregation manager and the second media aggregation manager; displaying a prioritized plurality of paths between the first media aggregation manager and the second media aggregation manager that satisfy the projected utilization; and receiving a fourth input indicating a selected path of the plurality of paths.

Other features of the present invention will be apparent from the accompanying drawings and from the detailed description that follows.

BRIEF DESCRIPTION OF DRAWINGS

The present invention is illustrated by way of example, and not by way of limitation, in the figures of the accompanying drawings and in which like reference numerals refer to similar elements and in which:

FIG. 8 illustrates a BW on Link screen showing a utilization schedule for a selected node on the discovered network according to one embodiment of the present invention.

DETAILED DESCRIPTION OF THE INVENTION

Figure 1:
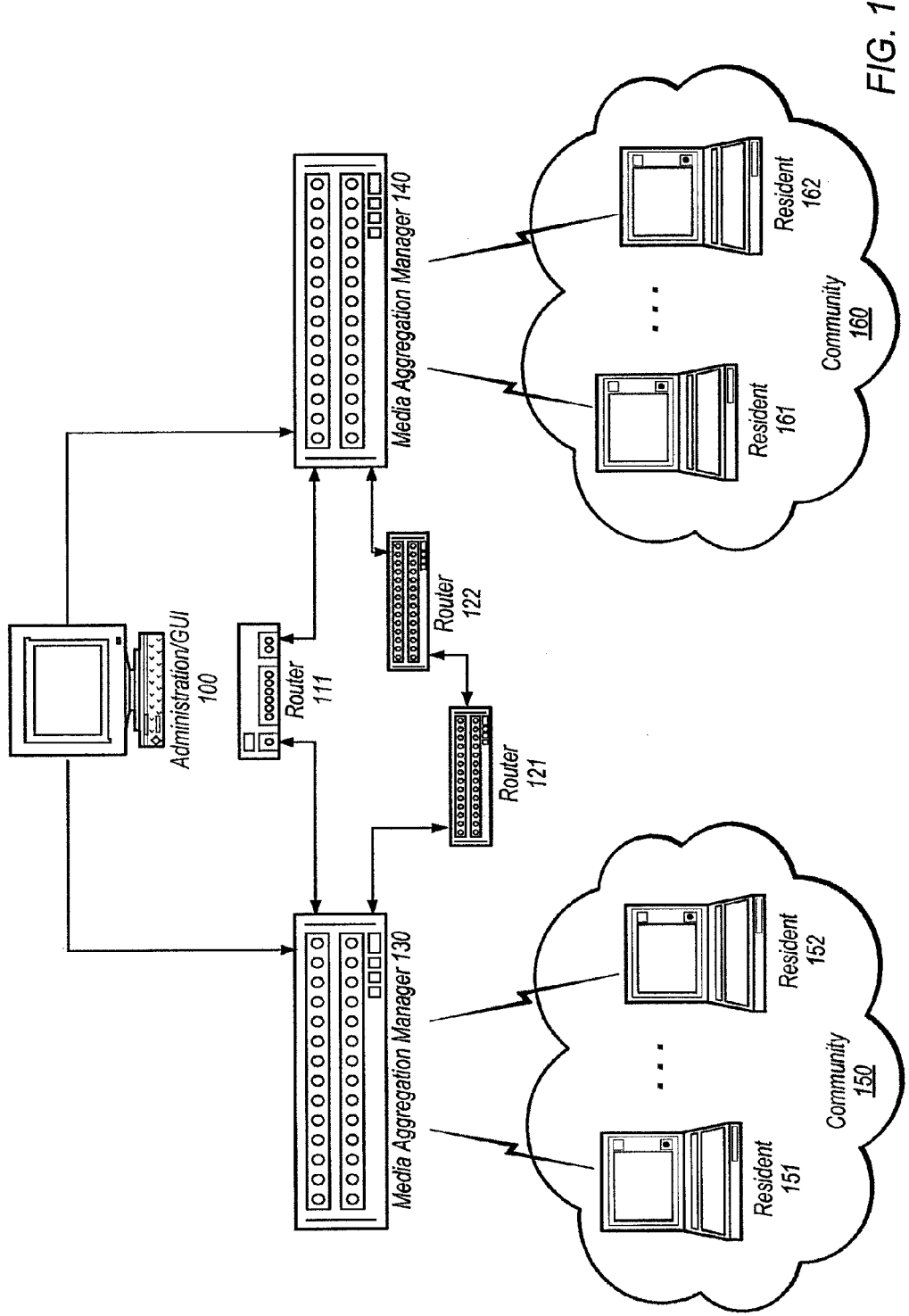
FIG. 1 illustrates an initialization control GUI in communication with a plurality of media aggregation managers according to one embodiment of the present invention.

Apparatus and Methods are described for initializing, allocating and de-allocating reservation protocol sessions between a plurality of media aggregation managers. Broadly stated, embodiments of the present invention seek to provide a graphical user interface (GUI) that enables a user to allocate and de-allocate bandwidth and reservation protocol sessions between a plurality of media aggregation managers along a path containing a plurality of routers. This is accomplished by allowing the user to analyze various repercussions of increasing/decreasing the user demand over various paths on a Voice over Internet Protocol (VoIP) network and viewing the bandwidth effects at all nodes on the path for a schedule that varies based on usage variations at various times of the day, week, month or year.

Media aggregation managers are the subject of a related co-pending application having application Ser. No. 09/634,035, entitled "Multiplexing Several Individual Application Sessions over a Pre-allocated Reservation Protocol Session," (now U.S. Pat. No. 7,013,338, issued on Mar. 14, 2006) that is incorporated herein in its entirety by reference. As discussed in the related application, a media aggregation manager is initialized with an expected bandwidth utilization between it and another media aggregation manager. Two media aggregation managers, having pre-allocated an expected bandwidth usage between them, allow residents in a community to utilize a portion of the pre-allocated bandwidth without having to establish individual application sessions as previously required by conventional networks not utilizing media aggregation managers. This type of pre-allocated bandwidth between media aggregation managers saves time in establishing linking protocols and saves bandwidth overhead by not requiring each VoIP connection to establish its own link and maintain its own individual link.

One benefit of the graphical user interface of the present invention is that it allows a system administrator to adjust bandwidth allocation requirements for a plurality of users communicating between a plurality of locations based on historical and current utilization demands by allowing allocation and de-allocation of bandwidth reservations between a plurality of media aggregation managers. Additionally, another advantage of the present invention is that the GUI allows a user, by selecting a path, to initialize multiple routers along the path simultaneously without having to individually provision each router. The present invention addresses the inadequacy of current network management tools by providing a GUI for discovering a VoIP network, including the media aggregation managers residing on the VoIP network and allowing a user, based on predicted usage requirements, to initialize the media aggregation managers and the routers included on a selected path for a predetermined schedule.

According to one embodiment, a VoIP network containing a plurality of media aggregation managers is discovered and then displayed. The user may review individual properties for each of the nodes displayed on a network map. For example, the user may select two media aggregation managers for inter-communication analysis along with a predicted community demand of resources between the two selected media aggregation managers. The GUI displays a prioritized list of potential paths between the selected media aggregation managers including one or more routers for the communities to use in communicating between the media aggregation managers. Additionally, the user may select a path for an analysis of the effect of allocating the predicted bandwidth to a reservation protocol session between the selected media aggregation managers. The graphical user interface displays a predicted schedule of bandwidth traffic for any node on the network incorporating the predicted pre-allocated bandwidth that is being considered for allocation between the media aggregation managers. Based on the displayed data, the user may decide to allocate the bandwidth for all of the routers and media aggregation managers along the selected path, change paths, de-allocate bandwidth between these or other media aggregation managers or reduce/restrict the predicted community usage on a selected path.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention include various steps, which will be described below. The steps may be performed by hardware components or may be embodied in machine-executable instruction, which may be used to cause a general purpose or special purpose processor programmed with the instructions to perform the steps. Alternatively, the steps may be performed by a combination of hardware and software.

Embodiments of the present invention may be provided as a computer program product that may include a machine-readable medium having stored thereon instructions that may be used to program a computer (or other electronic devices) to perform a process. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to particular existing signaling, control, and communications protocol standards, such as International Telecommunication Union Telecommunication Standardization Section (ITU-T) Recommendation H.225.0 entitled "Call Signaling Protocols and Media Stream Packetization for Packet-based Multimedia Communication Systems," published February 1998 (hereinafter H.225.0); ITU-T Recommendation H.245 entitled "Control Protocol for Multimedia Communication," published May 1999 (hereinafter H.245); ITU-T Recommendation H.323 entitled "Packet-based Multimedia Communications Systems," published September 1999 (hereinafter H.323); and a particular bandwidth reservation protocol (i.e., RSVP), the present invention is equally applicable to various other signaling, control, communications and reservation protocols. For example, Session Initiation Protocol (SIP) may be employed to create, modify, and terminate application sessions with one or more participants. SIP is described in M. Handley et al., "SIP: Session Initiation Protocol," RFC 2543, Network Working Group, March 1999, which is hereby incorporated by reference.

In addition, for sake of brevity, embodiments of the present invention are described with reference to a specific application (i.e., VOIP) in which individual flows may be multiplexed over a pre-allocated bandwidth reservation protocol session. Nevertheless, the present invention is equally applicable to various other applications that require real-time performance, such as applications based on human interactions (e.g., collaborative software, online/Web collaboration, voice conferencing, and video conferencing), and the like.

TERMINOLOGY

Brief definitions of terms used throughout this application are given below.

A "media aggregation manager" may generally be thought of as a network device, such as an edge device at the ingress/egress of a user community, or a group of one or more software processes running on a network device that provides application/protocol specific multiplexing/de-multiplexing of media traffic onto a pre-allocated reservation protocol session.

A "reservation protocol" generally refers to a protocol that may be employed to communicate information regarding a desired level of service for a particular application flow. An example of an existing bandwidth reservation protocol is RSVP.

A "community" generally refers to a group of residents on a common network at a given location. For example, employees on an enterprise network at a given location or users of a particular Internet service provider (ISP) at a given location may represent a community.

A "reservation protocol session" generally refers to a set of reserved network resources, including the routers utilized for the session, established and maintained between two or more network devices that serve as proxies or gate-keepers for application endpoints residing behind the proxies. An example of a reservation protocol session is an RSVP session between two media aggregation managers.

"Total available bandwidth" refers to the amount of bandwidth accessible for any given router or could refer to the maximum available bandwidth of the most limiting node on a path between two selected nodes and their intervening nodes.

The "available communication bandwidth" encompasses the amount of bandwidth accessible for the desired type of communication to be reserved in any reservation protocol session. For instance, in one embodiment, the user may wish to allocate reservation protocol sessions for VoIP communication. In one case, 75% of the total available bandwidth may be the available communication bandwidth for VoIP type communications and a reservation protocol session initialized for 100 users between two media aggregation managers may only require 10% of the available communication bandwidth.

An "application session" generally refers to a session established and maintained between two or more terminals. According to embodiments of the present invention, one or more application sessions may be multiplexed onto a single reservation protocol session thereby reducing the overhead for establishing and maintaining multiple application sessions.

A "terminal" generally refers to a LAN-based endpoint for media transmission, such as voice transmission. Terminals may be capable of executing one or more networked applications programs. An example of a terminal would be a computer system running an Internet telephony application, such as COOLTALK or NETMEETING.

An "application" or "endpoint" generally refers to a software program that is designed to assist in the performance of a specific task, such as Internet telephony, online collaboration, or video conferencing.

Media Aggregation Manager Overview

FIG. 1 conceptually illustrates interactions between two media aggregation managers 130 and 140 according to one embodiment of the present invention. The media aggregation managers 130 and 140 act as reservation protocol proxies on behalf of the communities 150 and 160 where a plurality of residents wish to communicate with each other. For example, resident 151 may wish to communicate with resident 161 while resident 152 wishes to communicate with resident 162. The media aggregation managers, pre-allocate bandwidth and establish a reservation protocol session capable of handling multiple communications between residents in community 150 and residents in community 160. Having media aggregation managers controlling a single reservation protocol session for multiple communication for residents between a plurality of communities allows for packets of communication data to be efficiently multiplexed and reduces protocol overhead as individual pairs of residents need not maintain their own application sessions.

The reservations may apply to various paths. For example, the bandwidth reservation may lay over path 110 containing one intermediary router 111 or may be allocated over path 120 containing two intermediary routers 121 and 122. The reservation for communications between community 150 and community 160 may also be split over the various paths 110 and 120 depending on the historical and current bandwidth burden on individual routers 111, 121 and 122. The media aggregation managers reserve a protocol session and then multiplex the plurality of data packets for a plurality of communication links to be communicated. As prior technologies required each resident in a community to request an individual reservation session to establish a link between community 150 and community 160, media aggregation managers and the apparatuses and methods for initializing/controlling the media aggregation managers have been developed. Embodiments of the present invention provide a graphical user interface 100 that enables a user to interactively discover, analyze and initialize the media aggregation managers to handle a schedule of community communications.

The administration GUI tool used for initializing the routers and media aggregation managers is illustrated as designator 100 in FIG. 1. The instructions for the GUI may reside in any combination of hardware or software and likewise may reside on any system configured to interact with other nodes on the network.

Graphical User Interface Overview

Figure 2:
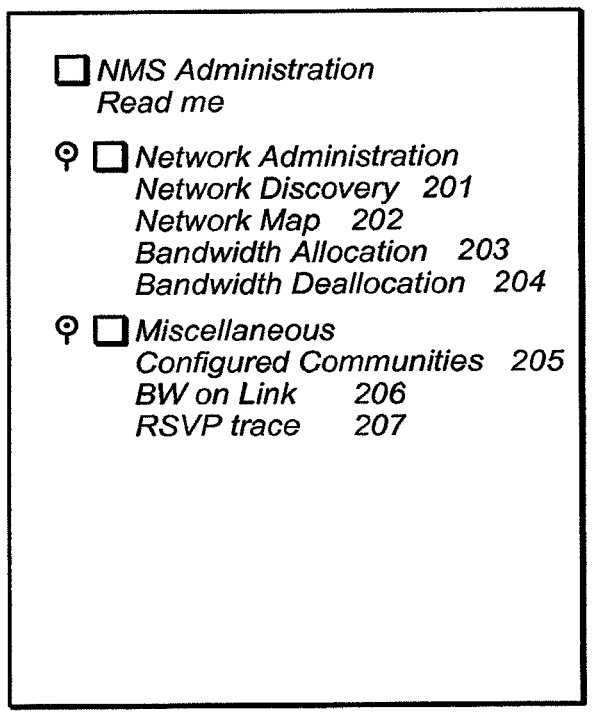
FIG. 2 is a menu of available screens for the initialization GUI according to one embodiment of the present invention.

FIG. 2 demonstrates one embodiment of a navigation tool for accessing various screens of the graphical user interface. In the embodiment depicted, a user may choose from one of the listed options, for instance, a user may select Network Discovery 201 to discover the network to be initialized or may choose Bandwidth Allocation 203 to allocate bandwidth to or establish a reservation protocol session between selected media aggregation managers as will become apparent in the following description.

Figure 3:
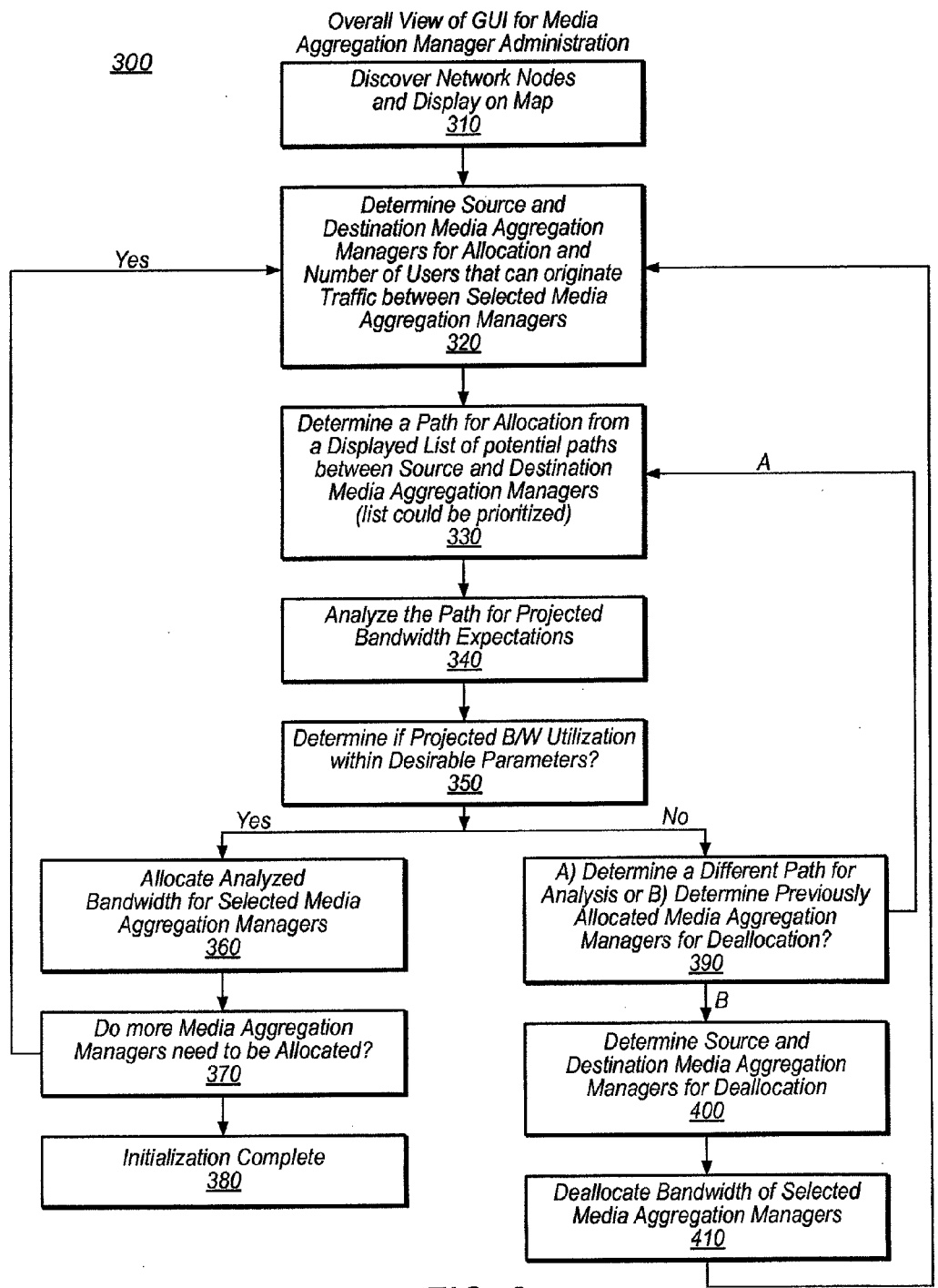
FIG. 3 is a flow diagram illustrating a typical user navigation flow through the initialization process according to one embodiment of the present invention.

An example of how a user may navigate through the menu to administer to a network is depicted in FIG. 3. Beginning with the menu depicted in FIG. 2, a user may select Network Discovery 201 in processing block 310. Once the Network Discovery 310 is complete, the user may select to display the network map by selecting Network Map 202 from the menu. After viewing the network map that displays all or a subset of the communities, nodes and media aggregation managers currently on the system, the user may choose to go directly to the Bandwidth Allocation screen 203 by selecting the menu link or may choose to right-click on a graphical representation of one of the media aggregation managers and select from a pop-up menu to allocate bandwidth for that particular media aggregation manager. In either case, a Bandwidth Allocation screen presents itself to the user enabling him to select two media aggregation managers and indicate the number of users capable of communicating via the selected media aggregation managers 330. Once the user indicates which media aggregation managers are to be allocated and how many users are predicted to utilize the session, one or more potential paths, between the two media aggregation managers are displayed on the bandwidth allocation interface. The user may select a path for analysis and, through the graphical user interface, indicate that the selected path is to be analyzed. At processing block 340, the selected path is analyzed to determine projected bandwidth utilization for each link of the selected path. Once analyzed, a user may select BW on Link 206 from the menu or the BW on Link screen may automatically appear after analysis has completed.

On the BW on Link screen, the user may select any node on the network, specifically of interest would be those altered by the predicted increase in usage. In response to being selected, the screen displays a schedule of usage for that node and optionally a projection indicating if the predicted usage increase is within all acceptable range 350. When the predicted usage is within an acceptable range, the media aggregation managers may be initialized. In one embodiment, the user selects Bandwidth Allocation 203 from the menu and, based on the nodes all falling within an acceptable range, the bandwidth for the selected media aggregation managers 360 and the routers along the path is allocated. The user can then decide if more media aggregation managers need to be allocated 370 (for instance, if a pre-existing plurality of communities are experiencing an increase of residents in the near future). When no more media aggregation managers need to be initialized, then the initialization is complete 380. On the other hand, when more media aggregation managers need to be initialized, the user may return to the network map interface through the Network Map menu item 202 or may return directly to the Bandwidth Allocation Interface through the Bandwidth Allocation menu item 203 and repeat the media aggregation selection process just described.

Alternatively, if the BW on Link screen provides data indicating that the predicted bandwidth utilization on any portion of the schedule exceeds the limitations of the network, the user may choose to select a different path for analysis or select to de-allocate a previously allocated session between two other media aggregation managers 390. In either case, the user may return to the Bandwidth allocation page to select a different path through the bandwidth allocation menu item 203 or the user may select a different combination of media aggregation managers to analyze or de-allocate. If the user decides to de-allocate a session, between two selected media aggregation managers to make available more bandwidth to accomplish the desired decrease in predicted utilization, the user may simply select the media aggregation managers 400 and then click on the menu option Bandwidth Deallocation 204 which bring up a dialog box 420 and de-allocate screen 430, shown in FIG. 4, allowing the user to de-allocate the current session between the selected media aggregation managers 410.

Network Map Interface

Figure 5:
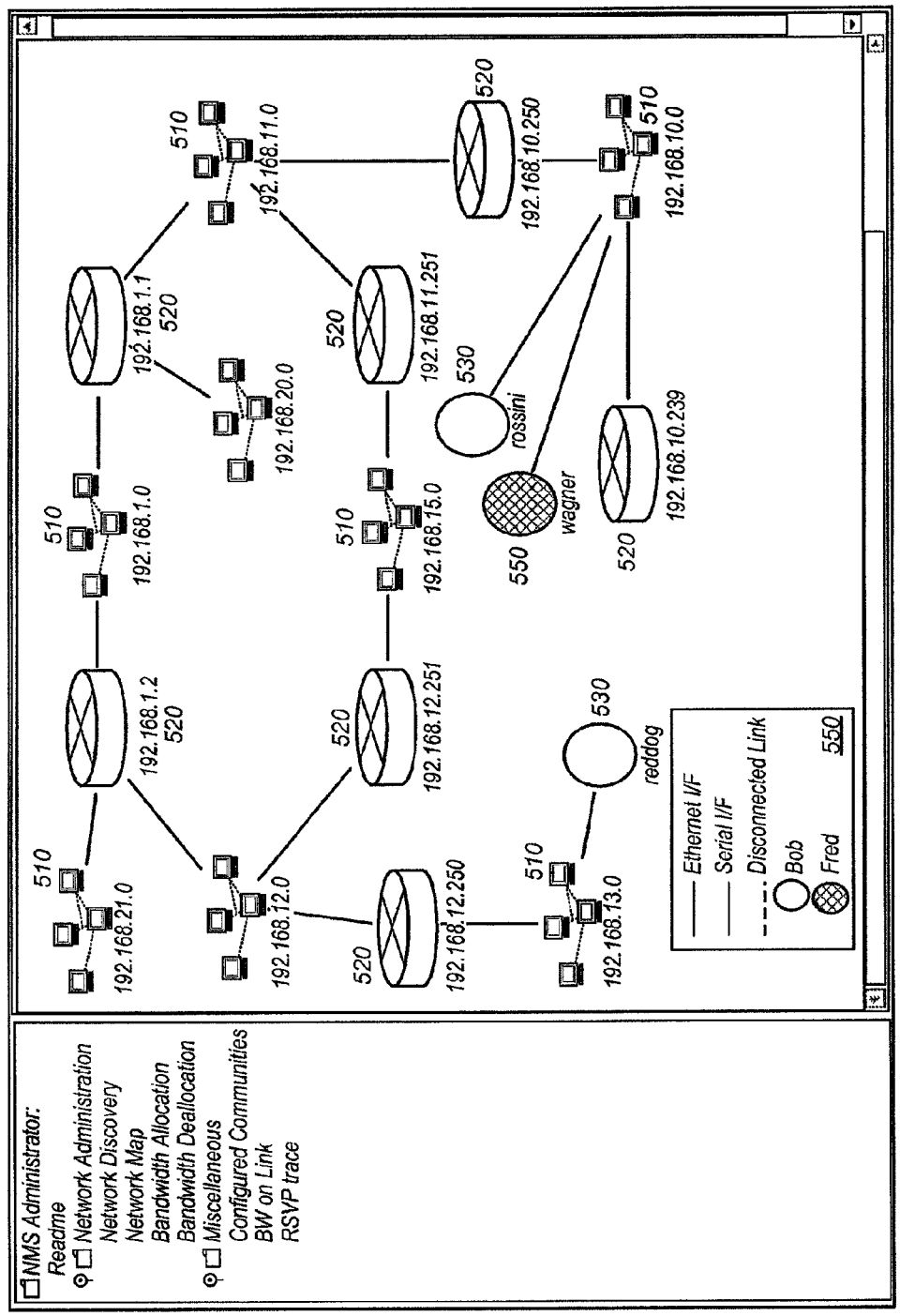
FIG. 5 illustrates a network map interface according to one embodiment of the present invention.
Figure 6:
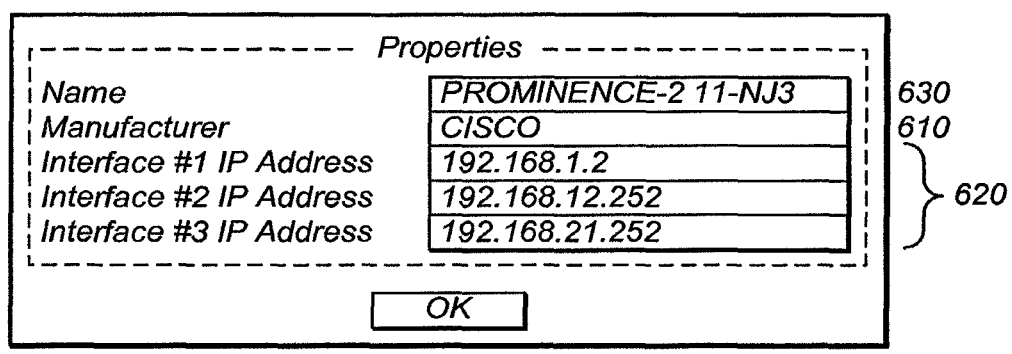
FIG. 6 illustrates a property window associated with a node according to one embodiment of the present invention.

FIG. 5 shows the network map interface according to one embodiment of the invention. A graphical representation of a plurality of nodes on the discovered network is shown. In addition, links between each of the nodes and the administration GUI 550 are shown. The network map screen indicates community nodes 510, router nodes 520 and media aggregation managers 530. In the present example, each of the nodes or media aggregation nodes are visually distinct via a graphical representation indicative of the type of node. The user is able to readily identify whether a node is a community, router, media aggregation manager, & etc. simply by looking at its graphical representation. The community nodes 510 may have a plurality of residents, including but not limited to computers, routers, phones, printers, scanners and the like. Each of the nodes and the media aggregation managers have properties associated with it that may be accessed by positioning the cursor over the graphical representation for the node and clicking on a mouse button assigned for property retrieval, in this embodiment, although not shown, the right mouse button is assigned for property retrieval. A properties window immediately appears as shown in FIG. 6 indicating information about the node such as the manufacturer 610, the interface addresses 620 or a name 630. Additionally, the properties window may indicate other information about the characteristics of the current configuration of the node. For instance, the property window for a media aggregation manager may indicate how many reservation protocol sessions it is maintaining and with which other media aggregation managers each of the reservation protocol sessions relate. The property window may also indicate the available bandwidth for a given node and for what type of communication the bandwidth is available, such as voice or data communication and the amount of bandwidth that is currently allocated for reservation protocol sessions utilizing this particular media aggregation manager as a proxy or gate-keeper. Other properties may include interface command options, such as allocate bandwidth, de-allocate bandwidth (not shown), or other interface command options that take the user to various interface screens and option windows.

Figure 7:
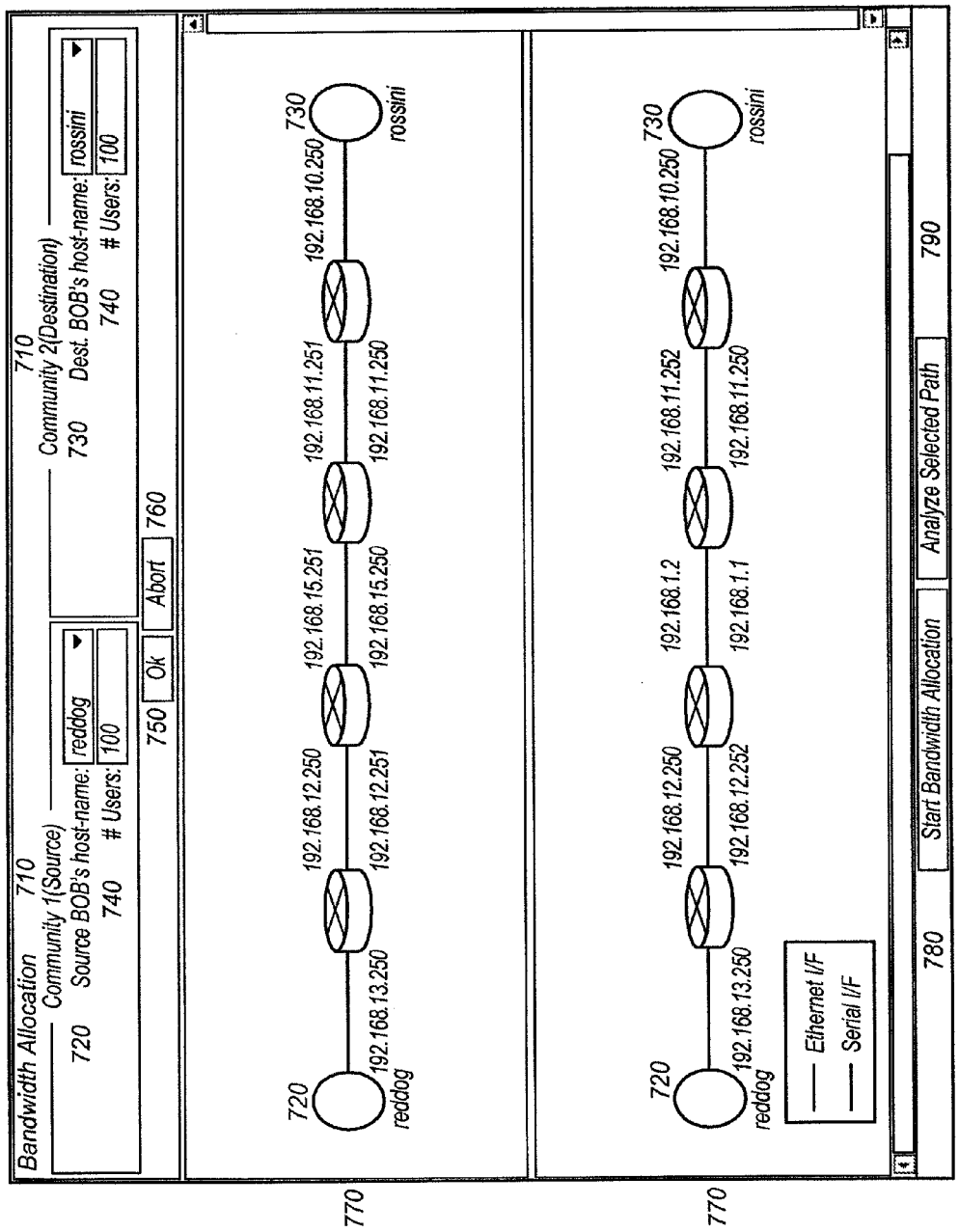
FIG. 7 illustrates a bandwidth allocation screen according to one embodiment of the present invention.

FIG. 7 is a snapshot of one embodiment of the bandwidth allocation screen. The user may select two community gate-keepers or media aggregation managers 710 for analysis or initialization. The present embodiment allows the user to select a source media aggregation manager 720, in this case "reddog" from a menu listing all media aggregation managers that were discovered on the network (not shown) and a destination media aggregation manager 730, in this case "rossini". The user may also designate the number of users 740 capable of communicating from each of the selected media aggregation managers. In this example, 100 users are capable of simultaneously communicating through the media aggregation manager reddog to residents whose gate-keeper or media aggregation manager is Rossini and likewise, 100 users are capable of communicating from Rossini to residents of reddog. Although the number of users for this example is 100 for both media aggregation managers, they need not be the same number of users.

Once the user has selected two media aggregation managers for analysis or initialization, the user may select "OK" 750 to indicate to the graphical user interface's processing algorithms to evaluate all available paths between the two media aggregation managers. The user may also decide to "abort" the path evaluation process by selecting the "abort" button 760.

In this example, two paths are determined during the path evaluation process although the invention is not so limited. The graphical user interface then displays the paths graphically depicting all intervening communities, routers or other nodes that lie between the selected media aggregation managers. The graphical user interface may display the list in a prioritized fashion utilizing factors such as the number of nodes between the media aggregation managers, the physical length of travel between nodes, the total available bandwidth on the nodes between the media aggregation managers, the available communication bandwidth, or the propagation speed between the various nodes that make up the path. For each factor or combination of weighted factors, the most limiting of the intervening nodes may be utilized for the computation as would be readily apparent to one skilled in the art.

The user may then select a path 770 to analyze. In most cases, the user may default to the highest prioritized path that in this case defaults to the first position on the graphical user interface but may be configured by the user to appear where desired. Alternatively, the user may see that a node in the prioritized path is going to ultimately be extremely burdened by other allocations that the user needs to initialize or has already been initialized and instead may opt for a lower prioritized path. In either case, according to this example, once the user has selected a path for allocation or analysis, he then chooses whether to reserve the protocol session between the two media aggregation managers by pressing the "start bandwidth Allocation" button 780 or the user may select to analyze the effect the bandwidth allocation would have on the nodes by selecting "analyze selected path" button 790.

The bandwidth allocation screen allows the user to abort the analysis at any time if so desired by selecting the "abort" button 760.

Figure 9:
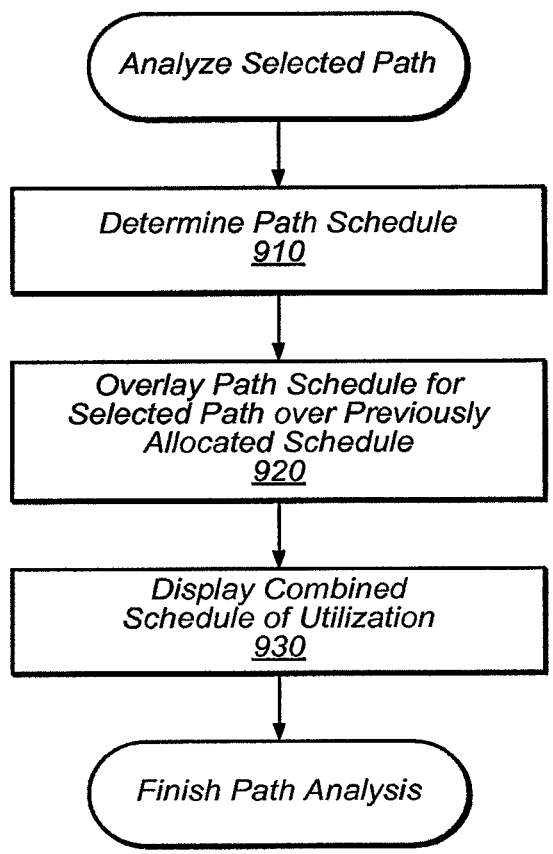
FIG. 9 is a flow chart indicating the process of analysis for a selected path according to one embodiment of the present invention.

FIG. 9 demonstrates what happens when the analyze button 790 is selected. In step 910, a schedule of bandwidth allocation is determined for the selected path. In step 920, after the predicted schedule for the selected path has been determined, the schedule of increased bandwidth allocation is overlaid on top of the schedule that accounts for bandwidth previously reserved to the nodes on the path via other media aggregation managers utilizing those nodes. Finally, in step 930, the combined schedule of usage is optionally displayed to the user.

Figure 8:
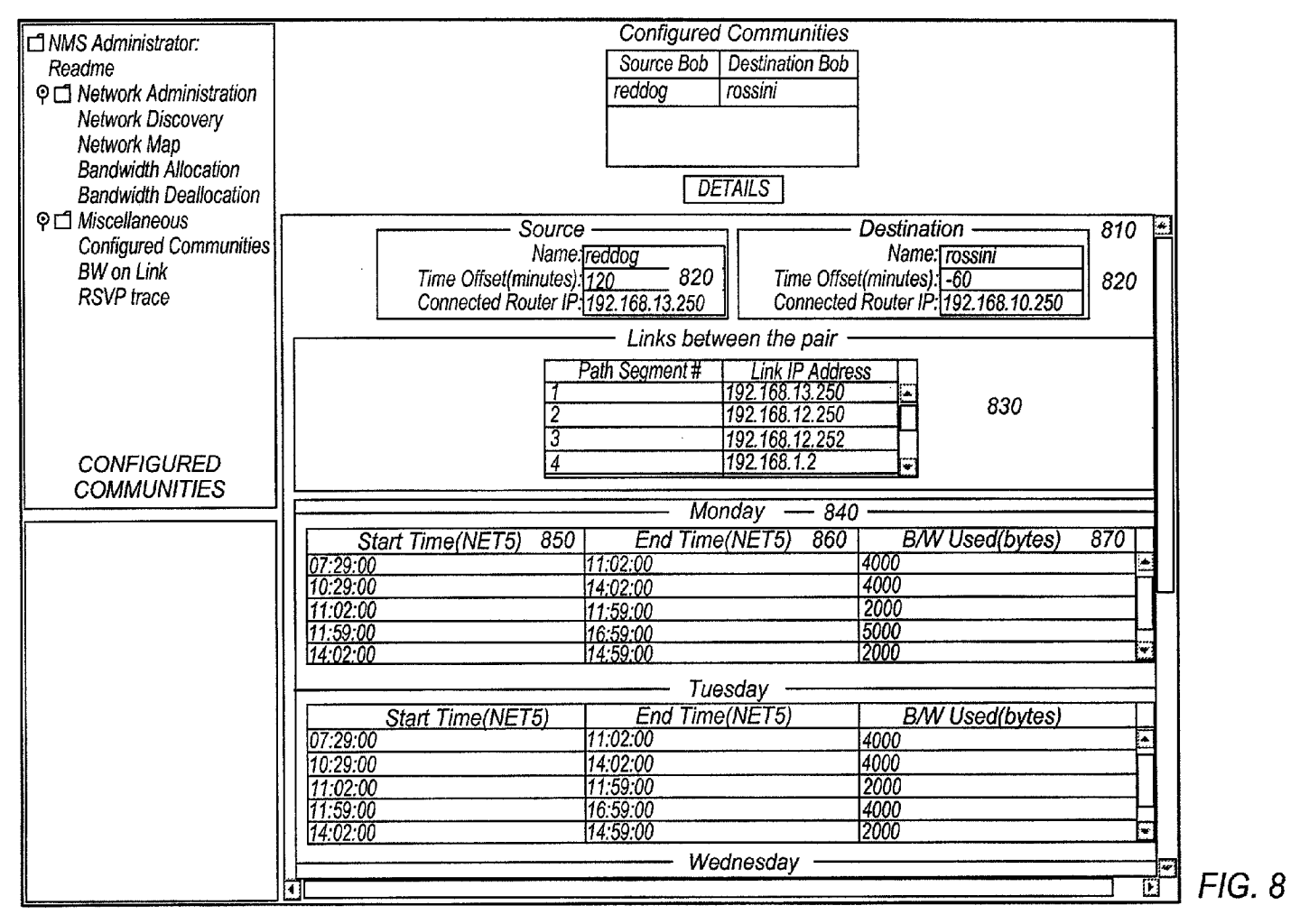

Once the analysis of the selected path has completed, the graphical user interface may automatically switch to the BW on Link screen shown in FIG. 8 or the user may select BW on Link from the menu on the left and previously discussed with regard to FIG. 2. The BW on Link screen, in this embodiment, displays the predicted utilization results of reserving the session as indicated on the Bandwidth allocation interface. As previously indicated, the displayed schedule incorporates all previously allocated sessions and bandwidth reservations burdening the intervening nodes as well as the predicted increase as a result of the analyzed path if it were to be allocated. The results of the analysis may be viewed for each of the nodes displayed in the network map, primarily of interest would be the nodes along the selected path so that a determination can be made as to whether the protocol session to be reserved will exceed the available communication bandwidth for any node at any time in the predicted schedule.

The media aggregation managers that have been analyzed are displayed 810. The user may indicate a time range for display by changing the offset for each router 820. Another segment of the display 830 indicates to the user all available and analyzed nodes between the selected media aggregation managers by way of a scrollable list of intervening nodes. The user may then select a node on the path and a schedule of utilization for that node appears 840. The schedule depicts a time frame including a Start Time 850 and End time 860 and indicates the bandwidth utilized during that time frame 870 and the amount of the available communication bandwidth 880 that would remain available after the analyzed path has been allocated. The schedule covers various segments of the day as determined by the offsets selected 820 and also indicates a schedule of usage for the node for various days of the week. Once the user verifies that the utilization on all of the nodes on the path are within a desirable range, the user may select to return to the bandwidth allocation screen shown in FIG. 7 and allocate the bandwidth 780.

Figure 10:
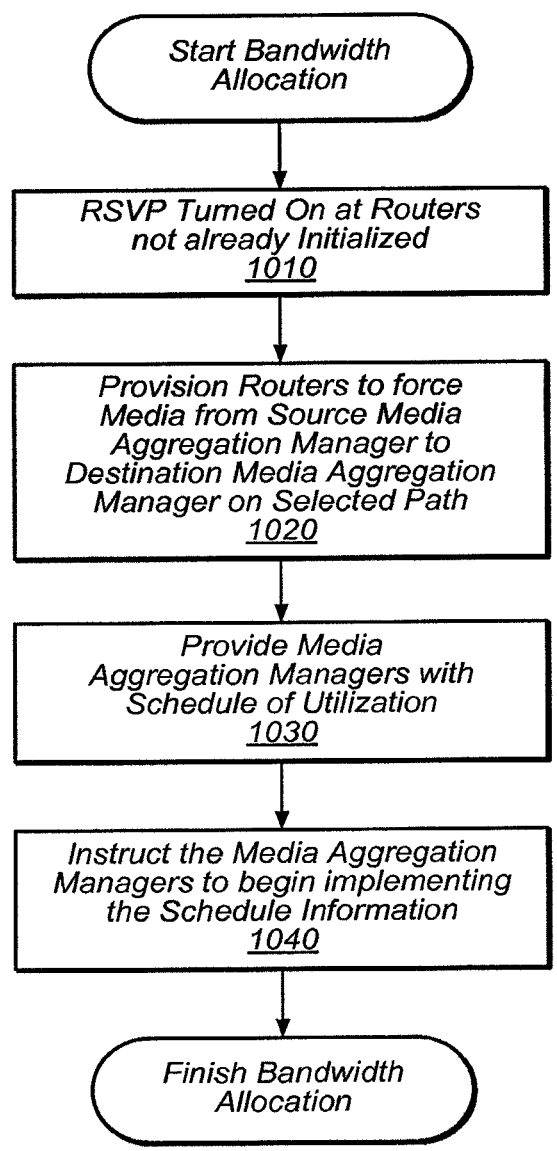
FIG. 10 is a flow chart indicating the process of initializing the selected media aggregation managers according to one embodiment of the present invention.

Once the allocate bandwidth button 780 is selected, the bandwidth for the media aggregation managers are allocated as shown in the flow chart in FIG. 10. In this example at step 1010, each and every router on the selected path where RSVP is not currently utilized, RSVP is enabled. In Step 1020, each router on the selected path is provisioned to force all communication media between the residents communicating between selected source and destination media aggregation managers to travel across the media aggregation managers and routers of the selected path. In step 1030, the media aggregation managers are initialized with all scheduling information necessary to reserve protocol sessions for the plurality of residents at any time within the schedule. The reservation protocol sessions manage the protocol sessions for multiple communication links in order to reduce the overhead and delay times occurring when individual links must be maintained as in previous technologies. The necessary scheduling information may include information such as how much bandwidth needs to be allocated for each session, expected increases and decreases in utilization based on time and other information necessary to manage a reservation protocol session. In step 1040, the media aggregation managers begin reserving protocol sessions according to the information schedule provided in step 1030.

Figure 4:
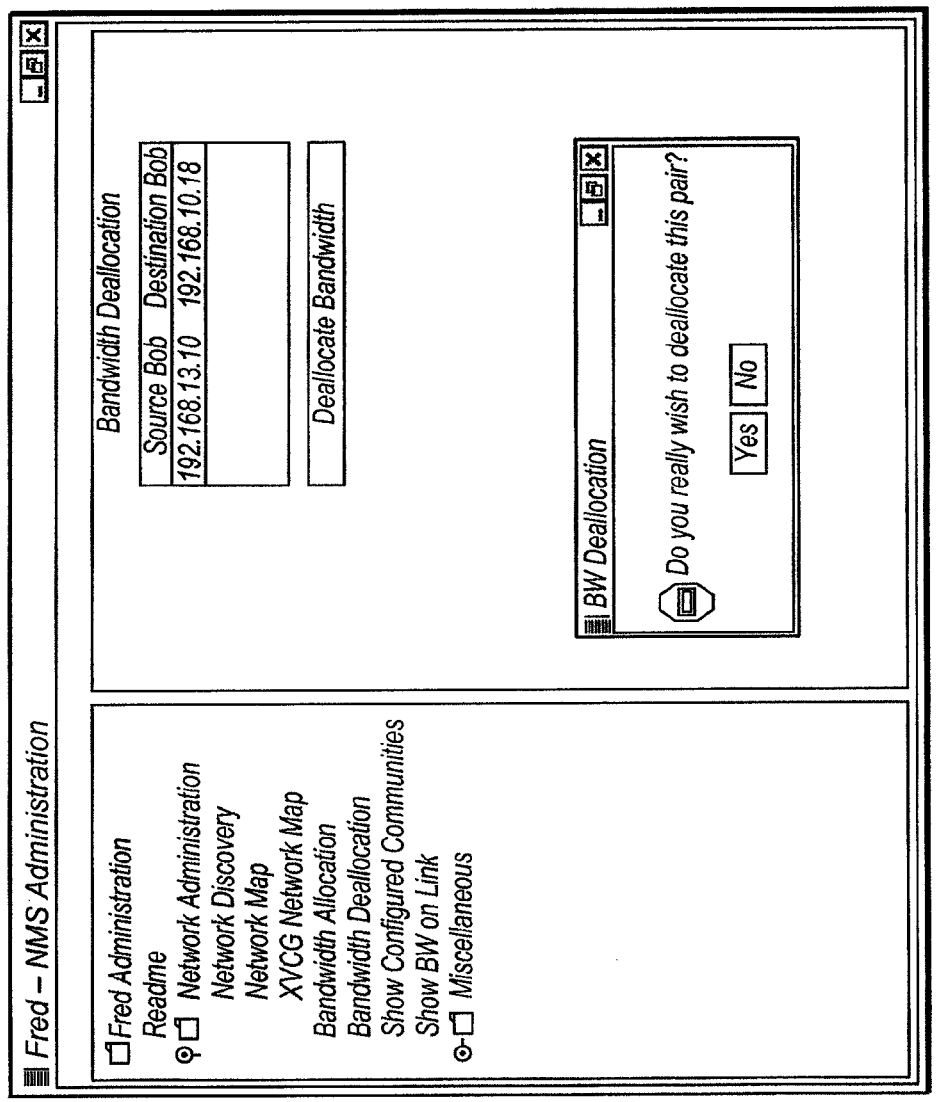
FIG. 4 is a screen used for de-allocation of the media aggregation managers according to one embodiment of the present invention.

In some instances, for example where the schedule indicates that utilization will exceed the available communication bandwidth, the user may select another path for analysis, select another pair of allocated media aggregation nodes for de-allocation or restrict the number of users allowed to communicate over the selected media aggregation managers. Should the user decide to de-allocate a previously allocated protocol session, he selects the media aggregation managers and then selects Bandwidth Deallocation 204 from the menu. FIG. 4 indicates a bandwidth deallocation screen and allows the user to select "deallocate bandwidth". In response, the graphical user interface provides a warning and confirmation dialog box. The user may then confirm the deallocation.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

We claim:

1. A method, comprising:
receiving information identifying a first path of a plurality of potential paths through a network that are capable of communicating data packets between a first node that comprises a first media aggregation manager and a second node that comprises a second media aggregation manager;
responsive to receiving the information identifying the first path, provisioning a plurality of routers for data packet routing between the first media aggregation manager and the second media aggregation manager over the first path;
receiving information of a predicted bandwidth usage related to the first path;
responsive to receiving the information of the predicted bandwidth usage related to the first path, deallocating at least a portion of bandwidth available to a first set of routers that are part of the first path, based at least in part on the predicted bandwidth usage; and
allocating at least a portion of the deallocated bandwidth to a second set of routers that are part of a second path of the plurality of paths that is different from the first path, based at least in part on the predicted bandwidth usage.

2. The method as recited in claim 1, wherein the allocating at least a portion of the deallocated bandwidth comprises:
enabling one or more of the second set of routers of the second path regarding the data packet routing based on a reservation protocol;
provisioning, based at least in part on the predicted bandwidth usage, the plurality of routers for data packet routing between the first media aggregation manager and the second media aggregation manager over the second path; and
initializing the first media aggregation manager and the second media aggregation manager with scheduling information related to the allocation of bandwidth for a reservation protocol session.

3. The method as recited in claim 2, wherein the scheduling information includes information, based at least in part on the predicted bandwidth usage, on (1) how much bandwidth needs to be allocated for the reservation protocol session, (2) expected increases and decreases in utilization over time, or both.

4. The method as recited in claim 1, wherein the provisioning the plurality of routers that are part of the first path comprises simultaneously provisioning the plurality of routers that are part of the first path.

5. The method as recited in claim 1, wherein, prior to the provisioning of the plurality of routers, the method further comprises:
determining a total combined schedule of bandwidth allocation by combining:
a predicted increase in bandwidth allocation, based at least in part on the predicted bandwidth usage, for each router of the first set of routers that are part of the first path; and
a current bandwidth allocation for each router of the first set of routers that are part of the first path representing bandwidth previously allocated.

6. The method as recited in claim 5, further comprising:
displaying the total combined schedule of bandwidth allocation for the first path.

7. The method as recited in claim 1, further comprising:
displaying a network map including visually distinguishable graphical representations of the plurality of routers, a plurality of communities associated with the plurality of routers, a plurality of nodes including the first and second nodes, and interconnections among the plurality of routers, the plurality of communities, and the plurality of nodes.

8. The method as recited in claim 1, further comprising:
receiving information regarding a first number of end users that are part of a first community that are capable of communicating via the first media aggregation manager; and
receiving information regarding a second number of end users that are part of a second community that are capable of communicating via the second media aggregation manager.

9. A method, comprising:
enabling one or more of a plurality of routers, that are part of a path through a network between a first node that comprises a first media aggregation manager and a second node for transporting data packets that comprises a second media aggregation manager, regarding data packet routing on the path between the first media aggregation manager and the second media aggregation manager based on a reservation protocol;
provisioning, based at least in part on predicted bandwidth usage related to the path, the plurality of routers between the first media aggregation manager and the second media aggregation manager through the plurality of routers;
initializing the first media aggregation manager and the second media aggregation manager with scheduling information related to allocation of bandwidth for a first reservation protocol session based at least in part on the predicted bandwidth usage;
deallocating at least a portion of bandwidth available for the first reservation protocol session; and
allocating at least a portion of the deallocated bandwidth for a second reservation protocol session.

10. The method as recited in claim 9, wherein the scheduling information includes information on (1) how much bandwidth needs to be allocated for the first reservation protocol session, (2) expected increases and decreases in utilization over time, or both.

11. The method as recited in claim 9, wherein the first reservation protocol session comprises a ReSerVation Protocol (RSVP) session.

12. The method as recited in claim 9, further comprising:
graphically depicting a plurality of potential paths through the network that are capable of communicating data packets between the first media aggregation manager and the second media aggregation manager;
receiving information identifying the path as a selected path from among the plurality of potential paths; and
graphically depicting the path as the selected path.

13. A non-transitory computer-readable medium storing instructions that, if executed, cause a computing device to perform operations comprising:
enabling one or more of a plurality of routers, that are part of a path through a network between a first node that comprises a first media aggregation manager and a second node for transporting data packets that comprises a second media aggregation manager, regarding data packet routing on the path between the first media aggregation manager and the second media aggregation manager based on a reservation protocol;

provisioning, based at least in part on predicted bandwidth usage related to the path, the plurality of routers between the first media aggregation manager and the second media aggregation manager through the plurality of routers;

initializing the first media aggregation manager and the second media aggregation manager with scheduling information related to allocation of bandwidth for a first reservation protocol session based at least in part on the predicted bandwidth usage;

deallocating at least a portion of bandwidth available for the first reservation protocol session; and allocating at least a portion of the deallocated bandwidth for a second reservation protocol session.

14. The non-transitory computer-readable medium as recited in claim 13, wherein the scheduling information includes information on (1) how much bandwidth needs to be allocated for the first reservation protocol session, (2) expected increases and decreases in utilization over time, or both.

15. The non-transitory computer-readable medium as recited in claim 13, wherein the first reservation protocol session comprises a ReSerVation Protocol (RSVP) session.

16. The non-transitory computer-readable medium as recited in claim 13, wherein the operations further comprise:

graphically depicting a plurality of potential paths through the network that are capable of communicating data packets between the first media aggregation manager and the second media aggregation manager;

receiving information identifying the path as a selected path from among the plurality of potential paths; and graphically depicting the path as the selected path.

\* \* \* \* \*